United States Patent [19]

Sandahl

[11] 4,232,984
[45] Nov. 11, 1980

[54] METHOD OF ANCHORING ELEMENTS AND A DEVICE FOR CARRYING OUT SAID METHOD

[75] Inventor: Evert G. I. Sandahl, Bjärred, Sweden

[73] Assignee: Cementa AB, Malmo, Sweden

[21] Appl. No.: 940,663

[22] Filed: Sep. 8, 1978

[30] Foreign Application Priority Data

Sep. 21, 1977 [SE] Sweden ............................ 77105674

[51] Int. Cl.³ ................................................ E04G 21/12
[52] U.S. Cl. ........................................ 405/261; 52/743
[58] Field of Search ................... 52/698, 93, 704, 743; 405/261

[56] References Cited

U.S. PATENT DOCUMENTS

| | | | |
|---|---|---|---|
| 2,829,502 | 4/1958 | Dempsey | 52/698 |
| 3,082,578 | 3/1963 | Lindstaedt et al. | 52/698 |
| 3,108,443 | 10/1963 | Schuermann et al. | 405/261 |
| 3,925,996 | 12/1975 | Wiggill | 405/261 |

*Primary Examiner*—James L. Ridgill
*Attorney, Agent, or Firm*—Young & Thompson

[57] ABSTRACT

A method of anchoring elements in rock or the like, an expandable portion thereof being embedded in a borehole; and a cartridge containing binder mixture and having a liquid-permeable but binder mixture-impermeable casing and further being surrounded by a rigidifying member. The cartridge is inserted in the borehole after having been immersed in a binder mixture-activating liquid penetrating its casing, thereby providing a substantially uniform mixture. When inserting the element in the borehole, activated binder mixture is pressed out of the cartridge without any spring effect occurring due to the rigidifying member being destroyed.

4 Claims, 4 Drawing Figures

METHOD OF ANCHORING ELEMENTS AND A DEVICE FOR CARRYING OUT SAID METHOD

The present invention relates to a method of anchoring different elements in boreholes. The method according to the invention and the device invented for carrying out the method enables such elements to be fastened with great reliability with an activated binding agent mixture, simultaneously as the activated binding agent mixture is always uniform, thus making it possible to fully utilize the same.

The achorage of elements such as reinforcement bolts in, for example, tunnel construction or mining is effected in principally two manners. One method, which can be called a mechanical anchoring, is characterized in that, during anchoring, a portion of the anchoring element is caused to expand in one way or another. The use of special elements which are caused to expand either in connection with the anchorage of the main element or separately, the main element being able to be anchored in the expansion element in various manners, can be included in this category. In mechanical anchorage, a special element or a portion of the main element will press against a material surrounding the element and be held there by the frictional force formed between the material and the element. The other method of anchoring elements intended for said purposes can be called a chemical anchorage. In this type of anchorage, a more or less viscous or plastic substance is, in one way or another, caused to more or less completely surround the inserted portion of the element. By means of chemical reactions, the substance is then caused to harden and said element is held by the hard body which is formed between the surrounding material and the portion of the element inserted in the same. A more or less accentuated adhesion which actively contributes to holding the element is formed between the substance and said element and between said substance and the surrounding material. One can also distinguish two types of methods in this case as well, one of which is characterized in that the formed substance contains a binder of inorganic origin, the other being characterized in that the binder is of organic origin. The method of mechanically anchoring the element in boreholes can also be combined with chemical anchoring, especially injection of cement mortar.

When mechanically embedding elements in holes, it has been found that the method is very unreliable as regards the magnitude of the frictional force arising between the element and the surrounding material. This type of embedment carries the risk that the element will creep in the event of great and/or prolonged stress. In order to reduce said problems, the mechanical anchoring method can be combined with the chemical anchoring method. In such cases, the injection of cement mortar is normally resorted to. In such injection, the mortar used should have a consistency of relatively low viscosity. Despite this, however, one cannot control how large a portion of the element portion inserted in the borehole has actually been embedded therein.

Attempts have been made to solve these problems by means of resorting completely to the chemical method. However, a method other than the injection method has been used in this connection. The binder substance has been introduced into the borehole in the form of different kinds of cartridges.

As regards inorganic binders, methods were developed according to which a mortar prepared on the construction site out of the inorganic binder and a filler and including activating liquids, normally water, was filled into cartridges which were then inserted into the borehole, whereupon the element which is to be anchored is inserted into said borehole, the mortar in the cartridge being thereby pressed out of the same and filling the space between the element and the material. This has not been found to be a totally unobjectionable method. This is primarily due to the rather complicated process of introducing finished mortar into the cartridges. According to a proposed method, this problem is solved by means of an ampule-like vessel consisting of a brittle material inside of which water has been enclosed being inserted into a cartridge filled with the binder and filler. During embedment, a cartridge is inserted into the borehole, after which the element which is to be anchored is inserted. The vessel containing water is thereby crushed, as is the cartridge. The "released" binder mixture and the water is mixed together by means of the element being rotated. However, there is one great disadvantage with said process. The mortar which is intended to bond the element to the surrounding material cannot be controlled as regards the quality of the mixing effect. A poorer mixture can entail that a portion of the binder is not supplied with any water at all. This results in that a portion of the binder is not utilized, the rest of the binder receiving an excessive amount of water. The fact that a portion of the binder is not used at all results in less strength that was intended, at the same time as the reacted mortar is of poor strength due to excess water.

According to other proposed methods, substances of partially organic origin are used, i.e. having an artificial resin as binder. Cartridges in which the bonding substance is stored until the cartridge is crushed by the penetrating portion of the element intended for anchorage are used in these methods as well. Methods of this kind differ from each other essentially in the construction of the cartridge containing the binder substance. Generally, when synthetic resins are used as binder, a hardener must be added to the bonding component. According to the different proposals, the hardener can be placed in the center of the cartridge next to the main substance or be placed so that the hardener surrounds the bonding component. According to some methods, the hardener and bonding substance are separated by different kinds of membranes. According to other methods, the hardener and binder are allowed to react with each other in the boundary surface between the two substances. No matter how the cartridge is constructed, the intention appears to be that the hardener and synthetic resin shall be mixed by means of the element being rotated as it is inserted into the borehole. Even in this case, it will be impossible to control the quality of the hardener and binder mixture. Thus, it is possible that strength will not be as great as intended. A further disadvantage is that costs for such cartridges are rather high, plus the fact that such cartridges can have a relatively short storage time. This should be especially true as regards cartridges which do not have any special membrane between the synthetic resin and the hardener.

The present invention relates to a method of embedding elements intended for said purpose in surrounding material, said embedment being able to be carried out in a simple but reliable manner. The invention eliminates many of the disadvantages inherent in previously proposed methods. At the same time, the invention offers a flexibility which previous methods have not been able to provide.

According to the invention, a cartridge containing a binder mixture and, if desired, a filler, for example finely grained sand, is used. The cartridge is preferably designed as a cylinder whose both ends are sealed. The binder can consist of hydraulic binder, but other types of binder can be used as well. The binder can also consist of a mixture of different binders.

The casing of the cartridge consists of a material which is liquid-permeable, for example so-called wet-strength paper, perforated plastic material or the like, said material not being permeable to the binder mixture stored in the cartridge. In order to achieve good manageability, the cartridge should be rigid. This is achieved by means of the cartridge being provided with a rigidifying member consisting of a rigid but brittle or otherwise resilient material. The rigidifying member can, for example, consist of plastic material such as unsoftened styrene plastic as well as glass or other similar material. The rigidifying member can consist of netting, longitudinal rods connected by means of rings of the same material, or the like. The rigidying member can be arranged so that it surrounds the cartridge, so that it lies immediately beneath the casing surrounding the cartridge, so that it is placed inside the cartridge surrounded by the binder substance, or it can be incorporated in the casing surrounding the cartridge.

The above-described cartridge is used when embedding elements intended for said purpose, said cartridge being placed in a binder-activating liquid if the binder consists of a hydraulically-bonding mixture such as water. The cartridge shall be stored in the activating liquid for a period of more than 30 seconds. During said period of time, the activating liquid is absorbed into the cartridge and into the binder substance. After said time period, the cartridge is removed from the liquid and, together with the required number of other cartridges treated in said manner, is inserted into the borehole, whereupon the element which is to be embedded in the borehole is inserted into the same. When the element is inserted into the borehole, the activated binder substance in the same will be pressed out of the cartridge at the same time as the member rigidifying the cartridge is destroyed or yields in some other manner. The binder substance pressed out of the cartridge does not then have to be mixed, as sufficient activating agent intended for bonding is present in all parts of the cartridge. Thus, the element does not have to be rotated while being inserted into the borehole in order to achieve a mixture of the binder mixture and the activating liquid. At the same time, that portion of the element which is inserted into the borehole will, despite this, be surrounded by a substance in which the bonding ability of the binder will be utilized totally and fully.

Accelerating, retarding, corrosion-inhibiting or frost-protective agents or mixtures thereof can be added to the binder mixture. In certain applications, expanding agents or gas developing or expanding agents can be added to the binder mixture. Accelerating, retarding, corrosion-inhibiting and frost-protective agents can also be added to the binder mixture in the activating liquid additive. This is effected by means of such an agent or agents being added to the activating liquid. For certain purposes and in certain binder mixtures, hydrophobing or plasticizing substances can be added.

The invention provides a simple method of embedding elements in surrounding material such as concrete, rock, etc. The method is both simple and reliable and eliminates the weaknesses inherent in previous methods. Furthermore, the method provides a flexibility which is lacking in the previously proposed methods. If, when assembling an element, the intention is to subject it to load at a later point in time, i.e. if the intention is to merely embed the element, a cartridge having a brief hardening time can be used for said purpose. Cartridges having normal or extended hardening time can, on the other hand, be used for the main anchorage. If the element is to be subjected to stress after a short period of time. Sufficient strength is achieved quickly by means of the addition of one or more accelerating agents. In certain cases, it can be worthwhile to extend the initial bonding time while a great strength is still relatively quickly achieved. This can be controlled by combining retarders and accelerators. As a large number of additives can be added to the binder together with the activating liquid, the number of different cartridges which would be required to fill the various needs which can arise at the construction site can be reduced.

Figure 1:
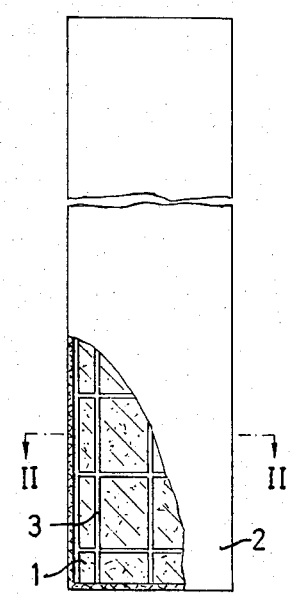
FIG. 1 is an elevational view partly in cross section showing a cartridge according to the present invention.
Figure 2:
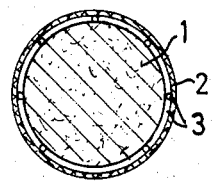
FIG. 2 is a cross-sectional view taken on the line II—II of FIG. 1.

In the drawings, the binder mixture is shown at 1, the casing at 2, and the rigidifying member at 3, comprising a plurality of rods extending lengthwise of the cartridge and interconnected by circular rings.

Figure 3:
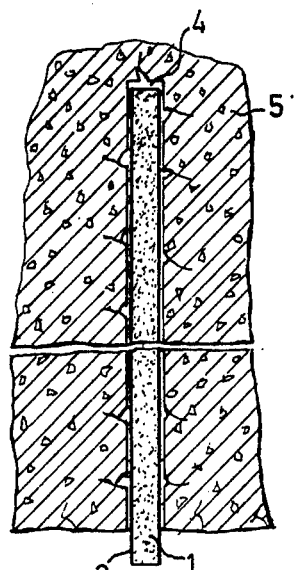
FIG. 3 is a cross-sectional view of a cartridge according to the present invention in place in a borehole in rock.
Figure 4:
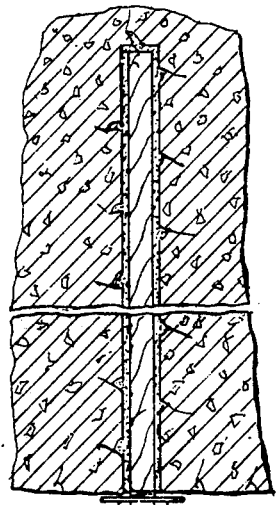
FIG. 4 is a view similar to FIG. 3, but showing the assembly after the bolt has been inserted.

As shown in FIG. 3, the cartridge is first inserted into a borehole 4 in rock 5, after which a bolt 6 is inserted in the cartridge so as to penetrate the cartridge from outside to the cartridge and press the binder mixture in the cartridge out of the cartridge into contact with the side walls of the borehole 4. Of course, prior to insertion, the cartridge was immersed in a liquid which activates the binder mixture, for the required period of time.

EXAMPLE

Cartridges containing a mixture of hydraulic binder, fine-grained ballast material and accelerators and having a liquid-permeable casing of wet-strength paper were manufactured. The cartridges were provided with a cover, consisting of a rigidifying member in the form of a net of rigid but brittle plastic material, said net surrounding the cartridges. The cartridges had a diameter of approx. 28 mm, a length of approx. 200 mm and a weight of between 180 and 200 grams.

A hole having a diameter of 32 mm was bored for the embedment of a cam steel having a diameter of 20 mm. Five cartridges of the kind described above were inserted into said borehole after having been totally immersed in activating liquid, in the present case water, for a period of 30 to 45 seconds. When the cam steel was inserted into the borehole, the mortar formed by the hydraulic binder mixture and the water was pressed out of the cartridge, whose casing was destroyed. The mortar filled up the space between the walls of the borehole and the cam steel. The embedment length was approx. 900 mm.

After 2.3 hours, the cam steel was subjected to a successively increasing tensile force until breakage occurred. The tensile force was 13.5 tons when breakage occurred. This corresponds to a breakage load of approx. 15 tons/m embedded bolt. The breakage took place in the cam steel.

What I claim is:

1. A cartridge for anchoring elements in rock, concrete and similar material by means of embedding a portion of the element which is to be anchored in a borehole, comprising a casing which is closed but which is penetrable by a said anchoring element to be subsequently inserted therein, a binder mixture which substantially fills the casing, and a rigidifying member surrounding the binder and which is yieldable without spring effect when a said element penetrates the cartridge, said casing being penetrable to water but not to said binder.

2. A cartridge as claimed in claim 1, in which said rigidying member is a reticulated member.

3. A method of anchoring elements in rock, concrete and similar material by means of embedding a portion of the elment which is to be anchored in a borehole, comprising immersing a cartridge containing a binder mixture, in a liquid which activates the binder mixture, for a time period of more than 30 seconds, whereby the activating liquid penetrates the cartridge and into the binder mixture so that a substantially fully uniform mixture is obtained, inserting at least one cartridge thus immersed, into the borehole, and then inserting into the borehole and into the cartridge a said element to be anchored, said element penetrating the cartridge from outside the cartridge and pressing the binder mixture in the cartridge out of the cartridge into contact with the side walls of the borehole.

4. A method as claimed in claim 3, and including in the cartridge a rigidying member which yields without giving rise to a spring effect, and deforming said rigidifying member upon insertion of said anchoring element.

* * * * *